Patented Jan. 15, 1952

2,582,587

UNITED STATES PATENT OFFICE 2,582,587

N-ALKYLAMINOPROPIOPHENONES

Edward L. Engelhardt, Collingdale, Pa., assignor to Sharp & Dohme, Incorporated, Philadelphia, Pa., a corporation of Maryland No Drawing. Application August 9, 1949, Serial No. 109,412

4 Claims. (Cl. 260—570.5)

This invention is concerned with the new chemical compounds 3,4-dihydroxy-α-isopropylaminopropiophenone, 3,4-dibenzyloxy-α-isopropylaminopropiophenone, and their salts, with acids.

Heretofore the ketonic type compounds of a structure related to 3,4-dihydroxyphenyl-α-alkylaminoalkyl-ketones have been thought to possess little value as bronchodilators and attention has been directed to the carbinol type compounds obtained by reduction of the ketonic group. However, it has been discovered as a feature of this invention that the compound 3,4-dihydroxy-α-isopropylaminopropiophenone and its salts with acids are effective bronchodilators. They offer the distinct advantage over various presently used bronchodilators in that they have markedly less effect on the heart in doses producing the same bronchodilator effect. For example, there is less effect on the heart rate and on the blood pressure with the use of 3,4-dihydroxy-α-isopropylaminopropiophenone to give the same bronchodilator effect than with other compounds of this type. A further useful quality of the compounds of this invention is their ready absorption following oral administration. This is particularly useful, for example, in the treatment of an asthmatic attack without the necessity of resorting to parenteral medication. The usual oral dosage is one or more tablets containing 25 mg. of the drug, depending on the severity of the symptoms and the individual patient response. It is to be realized, however, that the compounds of this invention can be administered parenterally, if desired.

In addition, the compounds of this invention have further utility in animal practice. For example, dogs, as well as humans, are subject to asthmatic attacks, and the compounds described herein are of value in affording relief from these attacks. It has been found that drug-induced asthma in dogs is relieved by administration of 3,4-dihydroxy-α-isopropylaminopropiophenone and its salts with acids.

The new chemical compound 3,4-dibenzyloxy-α-isopropylaminopropiophenone and its salts are intermediates for, and useful in, the production of the bronchodilator, 3,4-dihydroxy-α-isopropylaminopropiophenone and its salts.

The compounds of this invention are obtained from the known compound, 3,4-dibenzyloxy-α-bromopropiophenone by treating it with isopropylamine to produce 3,4-dibenzyloxy-α-isopropylaminopropiophenone which may be isolated as the free base or as a salt of any desired acid. These compounds are then catalytically hydrogenated to produce salts of 3,4-dihydroxy-α-isopropylaminopropiophenone from which the free base can be obtained. It is, of course, realized that any of the various salts can be obtained by treating the free base with the desired acid. As the preparation of the various salts depends only on the choice of acid used, it is to be understood that this invention embraces the acids commonly used to form salts with amines, for example, hydrochloric, hydrobromic, sulfuric, phosphoric, acetic, propionic, benzoic acids and the like.

In general, the reaction of the bromopropiophenone with isopropylamine is carried out in solution. Although the bromopropiophenone is insoluble in water, it is soluble in alcohols and benzene and these are suitable solvents for the reaction producing the 3,4-dibenzyloxy-α-isopropylaminopropiophenone. The reaction is carried out at reflux temperature and for a period of approximately three hours. It is preferred to use a solvent such that the reflux temperature is not greater than approximately 100° C. After concentration of the reaction mixture, addition of a water solution of the appropriate acid produces the desired salt which can be separated from the water and recrystallized according to known methods.

The hydrogenation step to produce the dihydroxy-compound from the dibenzyloxy-compound, is carried out according to known methods involving use of a solvent with which the hydrogen does not react, a catalyst such as palladium on charcoal, and hydrogen at atmospheric or higher pressure. The reaction mixture, exposed to an atmosphere of hydrogen, is shaken at room temperature until the required amount of hydrogen is absorbed. The catalyst is separated from the reaction mixture by filtration, the solvent removed from the filtrate preferably in vacuo and the compound recrystallized.

This invention is illustrated by, but not limited to, the following examples:

*Example 1—Preparation of 3,4-dibenzyloxy-α-isopropylaminopropiophenone hydrobromide.—* 21.2 g. (0.05 mole) 3,4-dibenzyloxy-α-bromopropiophenone and 9.3 g. (0.157 mole) isopropylamine were dissolved in 300 ml. absolute ethyl alcohol. The reaction mixture was maintained at reflux temperature on a steam bath for approximately three hours and then concentrated to approximately 50 ml. To this residue was added a mixture of 10 ml. 48% hydrobromic acid and 90 ml. water. There was produced a crystalline precipitate. This mixture was then diluted to a volume of approximately one liter with water and the product separated by filtration. On recrystallization from a mixture of alcohol and ether 3,4 - dibenzyloxy-α-isopropylaminopropiophenone hydrobromide was obtained in 84% yield, m. p. 192-193° C. with decomposition.

By repeating Example 1 using concentrated hydrochloric acid instead of the hydrobromic acid, there can be obtained 3,4-dibenzyloxy-α-isopropylaminopropiophenone hydrochloride.

*Example 2—Preparation of 3,4-dihydroxy-α-isopropylaminopropiophenone hydrobromide.*— 16.75 g. (0.0346 mole) 3,4-dibenzyloxy-α-isopropylaminopropiophenone hydrobromide (obtained as in Example 1) and 5.0 g. of 10% palladium on charcoal catalyst were suspended in 100 ml. absolute ethyl alcohol and the entire mixture shaken in an atmosphere on hydrogen at approximately 35 pounds per square inch pressure. This shaking was carried out at room temperature for approximately two hours resulting in the absorption of two molar equivalents of hydrogen. The catalyst was separated from the reaction mixture by filtration and the solvent evaporated under reduced pressure at approximately 55-60° C. The residue was recrystallized from a mixture of 95% ethyl alcohol and ether, yielding a solvated form of the desired compound. Drying in vacuo at 110° C. yielded a white crystalline powder, 3,4 - dihydroxy-α-isopropylaminopropiophenone hydrobromide. This material was characterized by analyses for carbon, nitrogen and hydrogen. The results obtained were in agreement with the theoretical percentages calculated for the desired compound.

*Example 3—Preparation of 3,4-dihydroxy-α-isopropylaminopropiophenone.*— 3.04 g. (0.010 mole) 3,4-dihydroxy - α - isopropylaminopropiophenone hydrobromide (obtained as in Example 2) was dissolved in 30 ml. of water. The solution was cooled in an ice bath and nitrogen passed through the solution at such a rate that an atmosphere of nitrogen was maintained over the solution. Two and one half milliliters of an aqueous solution of 4.98 N ammonium hydroxide was added dropwise with stirring. A cream colored precipitate separated. The stirring was continued for 15 minutes after the ammonium hydroxide had been added. Then the precipitate was separated by filtration, washed with cold water, then with absolute ethyl alcohol and finally with absolute ether. The product was dried in a vacuum desiccator over concentrated sulfuric acid and soda-lime. There was obtained 1.33 g. of 3,4-dihydroxy - α - isopropylaminopropiophenone, m. p. 174-174.5° C. (decomposition). The melting point varies with the rate of heating. The reported melting point was observed when the bath was preheated to 170° C. and the temperature of the sample raised at a rate of approximately 2° C. per minute.

The compound was analyzed for carbon, nitrogen, and hydrogen and the results obtained were in agreement with the theoretical percentages calculated for the desired compound.

*Example 4—Preparation of 3,4-dihydroxy-α-isopropylaminopropiophenone sulfate.*—1.00 g. (0.00448 mole) 3,4-dihydroxy-α-isopropylaminopropiophenone (obtained as in Example 3) was suspended in 30 ml. ethyl alcohol. 1.18 ml. sulfuric acid (3.81 N) was added. The solid dissolved on warming the mixture. A white crystalline powder was obtained by evaporating the solution to dryness under vacuum at approximately 50-55° C. The product 3,4 - dihydroxy - α - isopropylaminopropiophenone sulfate was recrystallized from absolute ethyl alcohol containing a few drops of water. It formed white crystals, m. p. 218-219° C. (decomposition). Analyses showed the composition of this compound to be two moles of 3,4-dihydroxy-α-isopropylaminopropiophenone to one mole of sulfuric acid.

*Example 5—Preparation of 3,4-dihydroxy-α-isopropylaminopropiophenone hydrochloride.*— 15.6 g. (0.035 mole) 3,4-dibenzyloxy-α-isopropylaminopropiophenone hydrochloride (obtained as in Example 1) and 5.0 g. of 10% palladium on charcoal catalyst were hydrogenated by shaking the reactants, together with 100 ml. absolute ethyl alcohol, in an atmosphere of hydrogen for approximately one and one-half hours at approximately 28 pounds per square inch pressure, during which time two molar equivalents of hydrogen were absorbed. The catalyst was separated by filtration and the solvent evaporated under reduced pressure at approximately 55-60° C. The residue was purified by repeatedly precipitating it from absolute ethyl alcohol containing hydrogen chloride by the addition of absolute ether. There was obtained a white crystalline powder, 3,4-dihydroxy-α-isopropylaminopropiophenone hydrochloride. The compound was analyzed for carbon nitrogen and hydrogen and the results obtained were in agreement with the percentages calculated for the desired compound.

Surprisingly, this bronchodilator agent, 3,4-dihydroxy-α-isopropylaminopropiophenone (and its salts) is unique among compounds closely related to it structurally in that it alone possesses the desirable combination of effectiveness as a bronchodilator, oral activity and minimum side effects.

The safety of this drug is demonstrated by the ratio, 1:60, between the therapeutically effective dose and the toxic dose.

What is claimed is:

1. A compound chosen from the group consisting of 3,4-dihydroxy-α-isopropylaminopropiophenone and its acid addition salts.

2. 3,4 - dihydroxy - α - isopropylaminopropiophenone hydrobromide.

3. 3,4 - dihydroxy - α - isopropylaminopropiophenone hydrochloride.

4. 3,4 - dihydroxy - α - isopropylaminopropiophenone sulfate.

EDWARD L. ENGELHARDT.

REFERENCES CITED

The following references are of record in the file of this patent:

UNITED STATES PATENTS

| Number | Name | Date |
|---|---|---|
| 815,653 | Stolz | Mar. 20, 1906 |
| 970,042 | Gruttefein | Sept. 13, 1910 |
| 2,151,459 | Bockmuhl et al. | Mar. 21, 1939 |
| 2,308,232 | Scheuing et al. | Jan. 12, 1943 |
| 2,431,285 | Suter et al. | Nov. 18, 1947 |

FOREIGN PATENTS

| Number | Country | Date |
|---|---|---|
| 277,540 | Germany | Aug. 21, 1941 |
| 379,950 | Germany | Sept. 1, 1923 |

OTHER REFERENCES

Barger et al., Chemische Zentr., 1911, Part I, page 29.